United States Patent [19]
Roehr

[11] Patent Number: 5,970,846
[45] Date of Patent: Oct. 26, 1999

[54] BREWERY INSTALLATION

[75] Inventor: Wolfgang Roehr, Georg-Bonne-Strasse 81, D-22609 Hamburg, Germany

[73] Assignee: Wolfgang Roehr, Germany

[21] Appl. No.: 08/930,143

[22] PCT Filed: Mar. 20, 1996

[86] PCT No.: PCT/EP96/01187

§ 371 Date: Oct. 9, 1997

§ 102(e) Date: Oct. 9, 1997

[87] PCT Pub. No.: WO96/32466

PCT Pub. Date: Oct. 17, 1996

[30] Foreign Application Priority Data

Apr. 13, 1995 [DE] Germany ............ 195 14 034

[51] Int. Cl.⁶ ............................................. C12C 13/00
[52] U.S. Cl. ............................................. 99/276; 99/277
[58] Field of Search ............................ 99/276, 278, 277, 99/277.1, 277.2; 114/256, 39.1, 343, 264, 188, 270

[56] References Cited

U.S. PATENT DOCUMENTS

| 490,524 | 1/1893 | Werner ................. 99/276 X |
| 4,542,683 | 9/1985 | Wilkinson ................. 99/277.2 |

FOREIGN PATENT DOCUMENTS 0 087 139 A3  8/1983  European Pat. Off. .
36 40811 A1  6/1988  Germany .

*Primary Examiner*—Reginald L. Alexander
*Attorney, Agent, or Firm*—Vidas, Arrett, & Steinkraus, P.A.

[57] ABSTRACT

A buoyant brewery installation, in particular a small-sized brewery installation mounted on a buoyant body, wherein a water conditioner, brewery apparatus, the tanks for fermentation and storing and other items necessary to produce beer are completely arranged on the buoyant body.

13 Claims, 1 Drawing Sheet

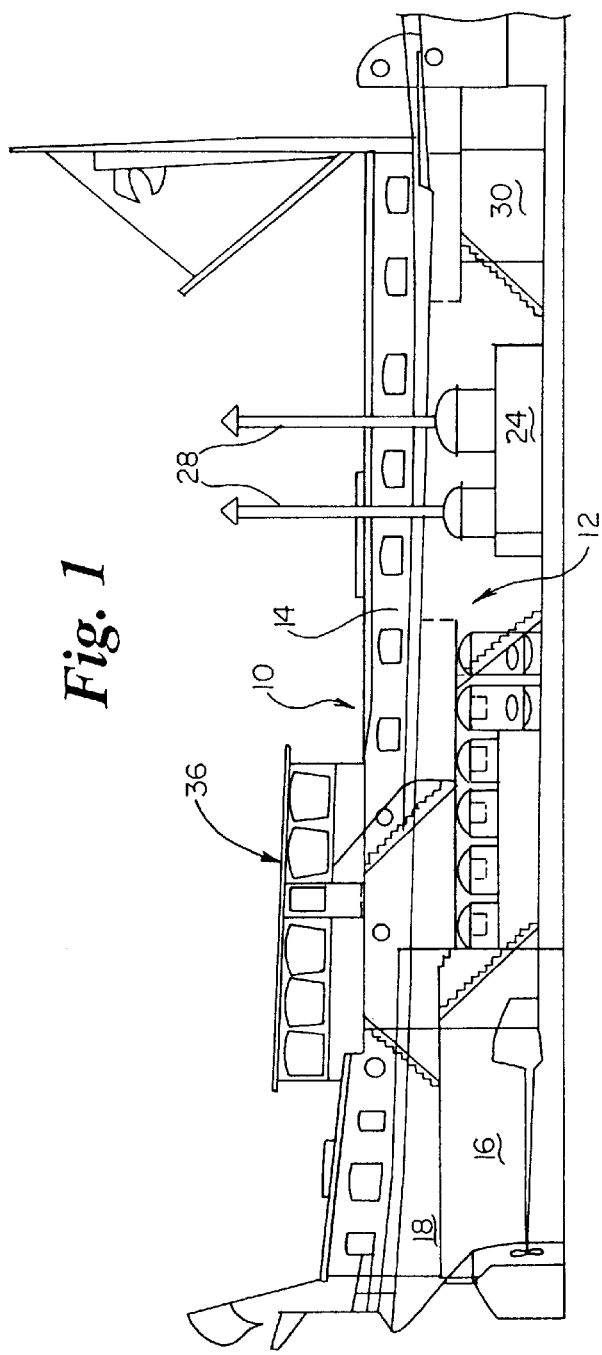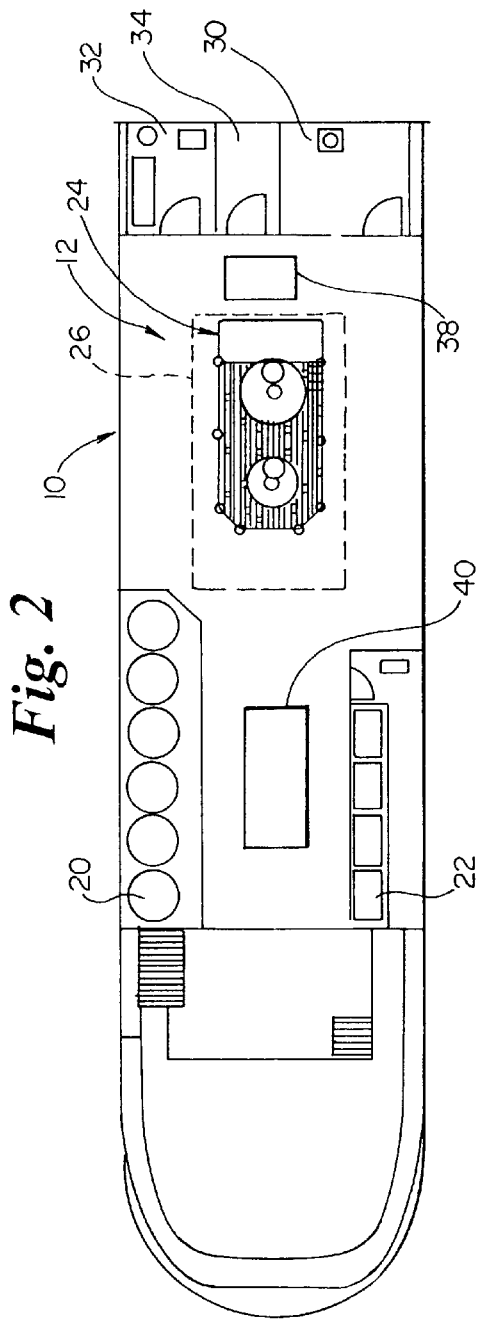

BREWERY INSTALLATION

FIELD OF THE INVENTION

The invention refers to a brewery installation, in particular a small-sized brewery installation.

BACKGROUND OF THE INVENTION

Small-sized brewery installations are produced and assembled similar as large brewery plants, with the individual components and means mounted in a building and interconnected by tube and/or pipes. From the EP 0 087 139 it has become known to fixedly mount the water conditioner means, the brewing means, the tanks for fermentation and storing and other means necessary to produce beer within containers, with the individual containers containing the installation components adapted to be interconnected. By the assembly of brewery installation components in containers the complete brewery plant can be established on arbitrary places. It is merely necessary to interconnect the delivered containers in order to make the brewery installation operable.

The establishing and the operation of brewery installations can meet a lot of problems, in particular at locations where it is difficult to acquire land or which cause high costs and where educated personnel or know how is not available. Furthermore, long-lasting certification procedures by authorities might be necessary.

It is an object of the invention to provide a brewery installation, in particular a small-sized brewery installation which is completely mobile and independent.

SUMMARY OF THE INVENTION

The invention provides a brewery installation wherein water conditioner means, brewing means, the tanks for fermentation and storing and other means necessary to produce beer are completely arranged on a buoyant body. The buoyant body is preferably a driven vessel, ship or boat. In particular, the ship or boat is seaworthy. However, the buoyant body can also be towed by a tug boat.

Due to the arrangement on a buoyant body, in particular on a seaworthy ship, the brewery installation can be established at a favourable site, with the vessel additionally containing guest rooms wherein the dispense of beer takes place as is the case with so-called inhouse breweries. The invention has the advantage that the brewery installation can be used in dependence of touristic seasons and may change its place if for instance it is no more interesting under touristic aspects. The location of the brewery installation on a vessel has the further advantage that in regions, where lands can be acquired only with very high prices, the vessel may be tied down at a suitable and low price mooring area. Normally, such mooring areas are available in many countries and regions.

Preferably, the brewery installation according to the invention is located in a lower deck in case more than one deck is provided. It is understood that the brewing means includes a chimney or other exhaust means. These are preferably extended above the upper deck.

According to an embodiment of the invention, the brewing means is located in the center of the vessel or on the longitudinal axis thereof, respectively, in order to not affect the attitude or position of the vessel. The necessary fermentation and storage tanks are preferably located on opposing longitudinal sides of the buoyant body. The weight of the tanks on opposite sides are approximately the same so that particularly trimming problems for the vessel do not occur.

The remaining space between the components of the installation under deck can be used as guest rooms, with according to an embodiment of the invention a wall surrounding the brewing means which is at least partially transparent. The view on the pans for wort and mash of copper material may be regarded as an improvement of the appearance of the guest room. In case of an intermediate deck this can be approximately completely used as guest room; also the use of the upper deck is possible under respective weather conditions.

The brewery installation according to the invention can be operated completely autonomous, i.e. can be also provided with energy supply means and water conditioner means. For the water conditioner means desalination means can be provided. The invention allows the brewing of beer with high uniform quality also in countries where the know how and the technical personnel can be only acquired under difficult circumstances.

In addition to the brewery installation also an installation for the dispensing of beer into bottles, cans, and barrels can be provided. The merchandising of the beer dispensed can be carried out from the ship, e.g. into the country to which the mooring area belongs. Furthermore, facilities can be provided for the production of other beverages as fruit beverages, limonades or other alcoholic beverages. For the latter case distilling means can be installed on the ship.

BRIEF DESCRIPTION OF THE FIGURES

An embodiment of the invention is subsequently described along accompanying drawings.

FIG. 1 shows a lateral view of a ship including a brewery installation according to the invention with the outer wall omitted.

FIG. 2 shows a plan view on the ship according to FIG. 1 below the deck.

DETAILED DESCRIPTION OF THE INVENTION

In FIGS. 1 and 2 a ship 10 is indicated having a lower deck 12 and an intermediate deck 14. A motor compartment 16 wherein also servo-aggregates are located is in the rear of the lower deck 12. Above the motor compartment is a caboose 18. More forward six storage tanks 20 and four fermentation tanks 22 are located on opposite sides in the lower deck 12. A brewing means 24 is approximately located in the center of the ship in the lower deck 12. As indicated by line 26 it is surrounded by a wall which is at least partially transparent. Two exhaust pipes 28 are connected to the mash and wort pans of the brewing means 24 and are extended through the intermediate deck 14 above the main deck.

A mill in a compartment 30 and a compartment 32 for an air tank and an air compressor and a compartment 34 for a bureau are located in the front portion of the ship. Compartment 30 can also serve as store for malt.

The remaining compartments (not designated) in deck 12 can be used as guest rooms. Also the intermediate deck 14 can be nearly completely used as guest room except the steering bridge 36.

The brewery installation shown can also include water conditioner means 38, in particular desalination means, in order to make available brewing water of a desired quality independent from external water supply sources.

The ship shown can be located at arbitrary mooring sites and also used as restaurant where the consumption of beer takes place. Besides this purpose or alternatively a dispensing of beer into bottles, barrels or cans or the like can take place by a suitable dispensing installation 40. The complete brewery installation is autonomous and does not depend on specific places. The brewery installation is operated in a conventional manner.

In order to compensate for motions of the ship caused by waves and in order to guarantee a satisfactory production all essential parts of the brewery installation can be supported in the ship such that they are constantly vertically or horizontally oriented, e.g. by a cardanic support.

I claim:

1. A buoyant brewery installation comprising, a buoyant vessel and a small-sized brewery installation mounted on the buoyant vessel, the brewery installation comprising means necessary to produce beer, including a water conditioner means, brewing means, tanks for fermentation and tanks for storing.

2. The buoyant brewery installation of claim 1, wherein the buoyant vessel is a driven vessel, in particular a ship or a boat.

3. The buoyant brewery installation of claim 2, wherein the ship or boat is seaworthy.

4. The buoyant brewery installation of claim 1, the buoyant vessel having a lower deck, wherein the components of the installation are located in a lower deck of the buoyant vessel.

5. The buoyant brewery installation of claim 1, wherein the brewing means are located in the center of the buoyant vessel.

6. The buoyant brewery installation of claim 1, wherein the brewing means are located on the longitudinal axis of the buoyant vessel.

7. The buoyant brewery installation of claim 1, wherein the storage tanks and/or the fermentation tanks are located at opposite longitudinal sides of the buoyant vessel.

8. The buoyant brewery installation of claim 4, wherein the remaining space between the installation components and the deck above thereof are defined as guest rooms.

9. The buoyant brewery installation of claim 1, wherein the brewing means are surrounded by a wall which is at least transparent.

10. The buoyant brewery installation of claim 1, wherein further a desalination means is located on the buoyant vessel.

11. The buoyant brewery installation of one claim 1, wherein a beer dispensing installation is located on the buoyant vessel.

12. The buoyant brewery installation of claim 1, wherein a distillery capable of producing beverages is located on the buoyant vessel for making other beverages.

13. The buoyant brewery installation of claim 1, wherein components of the brewery installation which are sensitive against changes of their position are supported in the buoyant vessel such that they are maintained substantially independent from the orientation of the buoyant vessel.

* * * * *